United States Patent
Messina

[15] 3,658,492
[45] Apr. 25, 1972

[54] DISTILLATE FUEL COLD FLOW

[72] Inventor: Steve J. Messina, Sterling Heights, Mich.

[73] Assignee: Ethyl Corporation, New York, N.Y.

[22] Filed: Aug. 4, 1969

[21] Appl. No.: 847,450

Related U.S. Application Data

[62] Division of Ser. No. 661,792, Aug. 21, 1967.

[52] U.S. Cl. ................................................44/62, 44/79
[51] Int. Cl. ..............................................................C10l 1/20
[58] Field of Search ..........................................44/62, 79, 80

[56] References Cited

UNITED STATES PATENTS

| | | | |
|---|---|---|---|
| 3,290,397 | 12/1966 | Rust et al. | 260/651 |
| 3,337,313 | 8/1967 | Otto | 44/62 |
| 3,245,766 | 4/1966 | Lifson et al. | 44/62 |
| 3,002,033 | 9/1961 | Feighner | 260/658 |

Primary Examiner—Daniel E. Wyman
Assistant Examiner—Y. H. Smith
Attorney—Donald L. Johnson

[57] ABSTRACT

A distillate fuel having improved cold flow containing a low molecular weight product obtained on reacting an allyl halide and a $C_{10}$ to $C_{20}$ olefin using an aluminum halide as a catalyst, the molar ratio of allyl halide to olefin being from 5:1 to 1:10. This reaction product is characterized by having a molecular weight of from about 550 to about 1,200. A suitable allyl halide is allyl chloride; suitable olefins are decene, dodecene, tetradecene, heptadecene, octadecene and the like.

10 Claims, No Drawings

DISTILLATE FUEL COLD FLOW

This application is a division of copending application Ser. No. 661,792, filed Aug. 21, 1967.

BACKGROUND OF THE INVENTION

Residual and distillate petroleum hydrocarbons are used as fuels in various applications. They are used as diesel fuels, jet fuels, home heating fuel, turbine fuels, rocket fuels, and in similar combustion systems. It is recognized that the fluidity of fuel oils in general is reduced as they are cooled. Additives which reduce the tendency of these fuels to become more viscous at low temperatures are available and are called pour point depressants. Another phenomenon which occurs when these fuels are cooled is that orifices and other narrow openings through which the fuel passes tend to become plugged. This occurs even when the fuel oil contains pour point depressants adequate to maintain proper viscosity at low temperatures. This latter characteristic of fuel oils, that is, their ability to flow through narrow orifices at low temperatures is referred to as cold flow.

In view of this need to overcome orifice plugging at low temperatures, additive which function as cold flow improvers in fuel oils are of substantial importance. The product invention comprises the discovery of an allyl halide/olefin reaction product which is effective as a cold flow improver in distillate fuels.

SUMMARY OF THE INVENTION

This invention relates to the product obtained by reacting an allyl halide and an olefin using a catalytic quantity of an aluminum halide, the molar ratio of the allyl halide: olefin being from 5:1 to 1:10, the product being characterized by having a molecular weight of from 700 to about 1,200. It further relates to distillate fuels having improved cold flow properties containing said reaction product.

DESCRIPTION OF PREFERRED EMBODIMENTS

It is an object of this invention to provide a product from a process which comprises reacting an allyl halide with an olefin, the molar ratio of allyl halide to olefin being about 5:1 to about 1:10 using an aluminum halide catalyst. This product is characterized by having a molecular weight of from about 550 to about 1,200. It is a further object of this invention to provide a distillate fuel having improved cold flow properties containing a small quantity of the allyl halide/olefin product described above. Another object of this invention is to provide a method of improving the cold flow characteristics of the fuel oil by adding thereto a small quantity of the allyl halide/olefin reaction product. These and other objects of the invention will be made clear from the description and claims which follow.

An embodiment of this invention is the product obtained from the process which comprises reacting an allyl halide with an olefin, said olefin having from about 14 to about 18 carbon atoms in the presence of a catalytic quantity of an aluminum halide selected from aluminum bromide and aluminum chloride, the allyl halide/olefin molar ratio being from about 5:1 to about 1:10, said product being characterized by having a molecular weight of from about 550 to about 1,200.

A preferred product is obtained when the allyl halide-olefin molar ratio is from about 1:3 to about 1:8. A most preferred product is obtained when the reactants used in the preferred product molar ratio are octadecene-1 and allyl chloride and the catalyst is aluminum chloride.

Another embodiment of this invention is a fuel oil containing a cold flow improving quantity of said allyl halide-olefin product described above. A preferred embodiment of this invention is the fuel oil described above wherein the concentration of said allyl halide-olefin product is from 0.001 to about 1.0 percent by weight. Another preferred embodiment is the fuel oil described above wherein the concentration of the allyl halide-olefin product is about 0.01 to about 0.5 percent by weight.

The present invention concerns the discovery that an allyl halide and an olefin can be reacted in the presence of an aluminum halide catalyst to produce an oil soluble product having a molecular weight of from about 550 to 1,200. The exact mechanism by which the reaction proceeds and the exact identity of the product are not known. The product may be considered to be a copolymer of allyl halide and olefin, but this has not been confirmed. This reaction will proceed with allyl halide to olefin molar ratios of 5:1 to 1:10. The product which is of more particular interest in this invention is one in which the molar ratio of allyl halide to olefin is from about 1:3 to about 1L8. The reason for preferring this latter molar ratio will be explained below when discussing the cold flow results obtained. In the examples below the process for preparing the product is set out in detail.

Monoolefins having from 12 to about 24 carbon atoms are useful in carrying out the reaction. Monoolefins having from about 14 to about 18 carbon atoms are preferred. Useful monoolefins include terminal olefins such as nonadecene-1, isobutylene tetramer, propylene hexamer, eicosene-1, dodecene-1, and the like, as well as internal olefins such as octadecene-2, heptadecene-4, dodecene-3, and the like. Mixtures of olefins may be used. The most preferred monoolefins are octadenene-1 and octadecene-2.

Commercial olefin mixtures comprising monoolefins primarily are also useful. These commercial olefin mixtures are generally mixtures of a series of homologues having from 12 to about 20 carbon atoms. Thus, useful mixtures may contain dodecenes, tetradecenes, heptadecenes, octadecenes, nonadecenes, and the like in varying proportions. Particularly useful mixtures are those in which the $C_{18}$ monoolefin predominates. By "predominates" I mean that the octadecenes make up at least about 40 percent by weight of the olefin mixture. Examples of these useful olefin mixtures are (a) 40 percent octadecenes, 60 percent $C_{12}$, $C_{14}$, $C_{16}$ and $C_{20}$ olefin mixture; (b) 50 percent octadecenes, 50 percent $C_{14}$, $C_{15}$, $C_{16}$, $C_{20}$ olefin mixtures; (c) 60 percent octadecene, 40 percent $C_{14}$, $C_{16}$ olefin mixture; (d) 70 percent octadecenes, 10 percent tetradecenes, 20 percent hexadecenes, and the like. These commercial mixtures are prepared in many ways. Generally, they are obtained by polymerizing low molecular weight olefins via the Ziegler catalyst route and by catalytically dehydrogenating suitable paraffins.

The allyl halide which is used to prepare the product of this process is suitably selected from allyl chloride, allyl bromide, and allyl iodide. Allyl chloride and allyl bromide are the preferred allyl reactants.

The process described above is catalyzed by an aluminum halide. Aluminum chloride and aluminum bromide are both useful as catalysts. The catalytic quantity of aluminum halide used may be varied. Generally, an amount from about 0.5 percent to about 5.0 percent by weight based on the total weight of reactants used, is useful; catalyst quantities of about 1 percent to about 3 percent by weight are especially useful. Thus, for example, if 80 parts of an olefin and 20 parts of an allyl chloride were to be reacted, 0.5 to about 5.0 parts by weight of an aluminum halide would be added as the catalyst.

The aluminum halide may be added to the reactants as a solid or as a solution. Addition of the aluminum halide in solution is preferred. Any aluminum halide solvent which will not adversely affect the reaction, may be used. Solvents which are particularly useful are alkyl halides having from two to about five carbon atoms. Examples of such solvents are ethyl chloride, 2-chloropentane, sec-butyl chloride, and the like. Especially preferred solvents are isopropyl chloride and n-propyl chloride. Generally, a saturated solution of the aluminum halide in one of the alkyl halides is used.

Where a solvent is used for the aluminum halide, it is substantially removed from the reaction product after the reaction is completed.

The temperature at which the reaction between allyl halide and olefin is carried out is not critical. Temperatures from about 0° C. to about 150° C. can be used. Generally, the lower the temperature, the longer the reaction will take to produce the product having the required molecular weight. Other factors which will affect the reaction temperature are, for example, the boiling point of the reactants or the reaction exotherm. If the reaction is conducted at atmospheric pressure, it is conveniently done at temperatures below 30° C. Since in most cases, the reaction produces heat, that is, it is exothermic, this exotherm will affect the overall temperature of the reaction, unless it is controlled.

Regarding reaction pressure, it is not critical. The reaction may be carried out at pressures below, at, or above atmospheric. As pointed out above, a pressure suitable for a particular system can be used depending on other variables such as the nature of the reactants, the reaction time desired and other similar variables. Generally, the reaction is carried out at atmospheric pressure.

The time of reaction is dependent on the system being used. Since the molecular weight of the product produced is the controlling factor, the reaction is allowed to proceed only until the required molecular weight as disclosed above is obtained. Times ranging from less than a minute to 24 hours can be used.

The reaction is generally short-stopped at the time when the reaction product has reached the desired molecular weight range. By short-stopped is meant that a substance is introduced into the reaction mixture to terminate the reaction. Suitable short-stop substances are materials having an active hydrogen such as alkanols. The type of short-stop material used is not critical.

In the following examples, methods of preparing the allyl halide/olefin products described above are given. All parts are by weight unless otherwise noted.

EXAMPLE 1

In a suitable vessel, a mixture of 11.5 (0.15 moles) parts allyl chloride and 75.6 (0.30 moles parts octadecene-1 was treated with 1 part AlCl₃ in 50 parts of n-propylchloride, at about 15° C. Addition of the catalyst solution required 1 minute and the temperature of the system rose from 15° C. to 26° C. After 10 minutes, the reaction was stopped by adding approximately 35 parts of isopropanol. The product was washed three times, each time with about 50 parts of water. At the final wash, the aqueous phase was free of chloride. The organic solvent was stripped under vacuum at 170° C. The yield of allyl chloride/octadecene reaction product was 6.9 parts. The molecular weight, determined by vapor pressure osmometry was 777. The product was a semi-solid yellow material and contained 3.62 percent chlorine.

EXAMPLE 2 3.62

The procedure of Example 1 was used except that 3.8 (0.05 moles) parts allyl chloride and 88.2 (0.35 moles) parts of octadecene-1 were used. The yield was 36.3 parts of a semi-solid yellow material. The molecular weight was 916, via vapor phase osmometry.

EXAMPLE 3

The following general procedure was used to prepare a series of allyl chloride octadecene reactant products. A saturated solution of AlCl₃ in an alkyl chloride was added over a period of 2-4 minutes to the mixture of allyl chloride/octadecene-1 in a suitable vessel. The reaction proceeded for 8-15 minutes. It was then short-stopped by adding about 100 parts of isopropanol. The reaction mixture was washed with 100 parts of H₂O and then again with 100-200 parts of a 1:1 H₂O/isopropanol solution. The washed organic layer was then stripped of solvent at 100°-175°C. under vacuum. The product was obtained as an opaque, yellow material ranging in consistency from liquid to semi-solid.

Following is a table indicating reactants, molar ratio, catalyst solvent, molecular weight of products obtained using the Example 3 procedure.

TABLE 1

| Example No. | Allylchloride: Octadecene-1 Molar Ratio | AlCl₃ Solvent | Product M.W.[1] |
|---|---|---|---|
| 3A | 1:3 | n-propylchloride | 702 |
| 3B | 1:4 | n-propylchloride | 794 |
| 3C | 1:6 | isopropylchloride | 680 |
| 3D | 1:9 | isopropylchloride | 817 |

(1) By vapor phase osmometry

As pointed out above, the allyl halide-olefin reaction products of this invention are emminently suited for improving the cold flow of fuel oils.

The fuels which are used in the compositions of this invention are petroleum hydrocarbons. They may be distillate fuels, residual fuels or blends of these two types. The distillate fuels are fractionation cuts from the distillation of either crude oil or the products from a cracking process. Cracked distillates are usually blended with straight run distillates before using. Kerosene is a typical distillate fuel. A residual fuel oil is the viscous product left after the more volatile fractions have been distilled or topped from the crude oil. It is the least expensive of the fuels obtainable from petroleum. It is used alone as well as in blends with the lower boiling distillate fuel fractions.

These fuels are also characterized by their boiling point range. In general, the useful fuels have a boiling point ranging from about 100° F. to about 1,000° F. The boiling point of most commonly used fuels ranging from about 200° F. to about 800° F. Useful fuels include diesel fuel oil grade DF-A, DF-1, DF-2; domestic fuel oil Nos. 1, 2, 3, 4 and 5; jet fuels such as JP-1, JP-4, JP-5, and the like.

The improved fuel oil compositions are prepared by dissolving the allyl halide-olefin reaction products directly in the fuel. No special equipment is required and conventional liquid mixing or blending equipment is required and conventional liquid mixing or blending equipment may be used. The cold flow improving additive on the other hand can be dissolved in a suitable solvent such as toluene, xylene, isopropanol, kerosene, or fuel oil in order to form an additive concentrate. This additive concentrate could then be used to prepare the additive fuel oil compositions. Additive concentrates can contain up to 50 percent by weight of the allyl halide-olefin reaction product.

In order to show the unobvious improvement in cold flow in fuel compositions of this invention, the fuel oil compositions were evaluated using the Enjay Fluidity Test. The Enjay Fluidity Test measures the flow characteristics of fuel oils through a narrow orifice. The procedure and test equipment are fully described in Enjay's brochure ELD-48439. The contents of that brochure are incorporated by reference as part of this specification. Briefly, the test involves measuring the amount of fuel oil which flows through an orifice in a given time at a given temperature. The testing device consists of a two-compartment cylinder connected by means of a capillary tube one-half inch long and 2.25 mm inside diameter, Each chamber is calibrated. Forty milliliters of the fuel oil to be tested are placed in one chamber of the cylinder; the cylinder is capped, inverted so that the fuel will not run into the other chamber, and placed in a bath set at the desired temperature for 2 hours. At the end of this time, the cylinder is inverted so that the cooled fuel now can run through the capillary tube into the second chamber. The test apparatus is kept in the cooling bath while the fuel is allowed to flow for three minutes. At this point, the amount of fuel which has flowed through is measured. It is reported as percent recovery of total fuel sample used. The higher the percent of fuel which passes through, the better cold flow the fuel composition has. Thus, for example if 20 ml. of fuel oil flows from the first chamber to the second chamber, the Enjay Fluidity Recovery is 50 percent.

Following is a table of Enjay Fluidity results obtained for a series of fuel oil compositions of this invention.

TABLE 2.—ENJAY FLUIDITY

| Fuel No.[a] | Additive prepared [b] from allyl halide (moles): olefin (moles) | Catalyst used | Concentration of additive weight percent | Molecular weight of additive [c] | Recovery (percent) |
|---|---|---|---|---|---|
| 1 | Allyl chloride:none | AlCl$_3$ | 0.1 | 358 | 5 |
| 2 | None:octadecene-1 | AlCl$_3$ | 0.1 | 848 | 2.5 |
| 3 | None:tetradecene-1 | AlCl$_3$ | 0.1 | 582 | 0 |
| 4 | Allyl chloride (1):octadecene-1 (1) | AlCl$_3$ | 0.05 | 728 | 45 |
| 5 | Allyl chloride (1):octadecene-1 (2) | AlCl$_3$ | 0.1 | 777 | 75 |
| 6 | Allyl chloride (1):octadecene-1 (3) | AlCl$_3$ | 0.1 | 702 | 100 |
| 7 | Allyl chloride (1):octadecene-1 (4) | AlCl$_3$ | 0.1 | 794 | 100 |
| 8 | Allyl chloride (1):octadecene-1 (4) | AlCl$_3$ | 0.05 | 794 | 97.5 |
| 9 | Allyl chloride (1):octadecend-1 (4) | AlBr$_3$ | 0.1 | 691 | 95 |
| 10 | Allyl chloride (1):octadecene-1 (5) | AlCl$_3$ | 0.1 | 1,025 | 95 |
| 11 | Allyl chloride (1):octadecene-1 (6) | AlCl$_3$ | 0.1 | 680 | 100 |
| 12 | Allyl chloride (1):octadecene-1 (7) | AlCl$_3$ | 0.1 | 916 | 90 |
| 13 | Allyl chloride (1):octadecene-1 (1) | AlCl$_3$ | 0.1 | 817 | 12.5 |
| 14 | Allyl chloride (1):tetradecene-1 (3) | AlCl$_3$ | 0.1 | 805 | 25 |
| 15 | Allyl chloride (1):tetradecene-1/hexadecene-1 (4) [d] | AlBr$_3$ | 0.1 | 680 | 20 |
| 16 | Allyl chloride (2):octadecene-1 (1) | AlCl$_3$ | 0.1 | 737 | 100 |
| 17 | Allyl chloride (4):octadecene-1 (1) | AlCl$_3$ | 0.1 | 576 | 25 |

[a] The base fuel was a commercial No. 2 grade fuel oil.
[b] Using procedures as described herein.
[c] By vapor phase osmometry.
[d] 2 parts by weight C$_{14}$/1 part by weight C$_{16}$.

The data in Table 2 demonstrates the effectiveness of the allyl halide-olefin additives as cold flow improvers. The data for Fuels 1, 2, and 3 show that low molecular weight reaction products of either allyl chloride alone or a C$_{14}$ or C$_{18}$ olefin along do not effect any significant cold flow improvement in fuel oil. When the additive used is a low molecular weight reaction product of allyl chloride and a C$_{14}$ to C$_{18}$ olefin, the cold flow of the fuel oil is significantly improved (Fuels 4–17). Fuels 6–12 show a recovery of almost 100 percent in each case. Since this high recovery data indicates greater effectiveness, the additives prepared from allyl chloride:octadecene-1 in a molar reaction ratio of from about 1:3 to about 1:8 are more effective and are therefore preferred. However, it is evident that all the allyl halide:olefin reaction products prepared as herein described are effective cold flow improvers for fuel oil.

The fuel oil compositions of this invention may contain other additives provided that these additives do not adversely effect the cold flow improving properties of the presently claimed additives. Such other additives include cetane improvers such as amyl nitrate and the like; dispersants such as the alkenyl succinic anhydride derivatives and the like; corrosion inhibitors such as linoleic acid dimers, sorbitan monoleate and the like; smoke reducers such as alkaline earth sulfonates, (methylcyclopentadienyl) manganese tricarbonyl and the like; dyes and other commonly used additives.

Having fully described the additives and fuel compositions of the present invention, it is intended that the invention be limited only within the spirit and scope of the following claims.

I claim:
1. A distillate fuel containing a cold flow improving quantity of the product obtained from the process which comprises reacting an allyl halide with a monoolefin having from 14 to about 18 carbon atoms, in the presence of a catalytic quantity of an aluminum halide selected from aluminum chloride and aluminum bromide, the allyl halide:olefin molar ratio being from about 5:1 to about 1:10, said product having a molecular weight of from about 550 to about 1200.

2. A distillate fuel of claim 1 wherein the concentration of said product is from 0.001 to about 1.0 percent by weight.

3. The distillate fuel of claim 1 wherein the concentration of said product is about 0.01 to about 0.5 percent by weight.

4. A distillate fuel containing from about 0.01 to about 0.05 percent by weight of the product obtained from the process of claim 1 wherein said allyl halide:olefin molar ratio is from 1:3 to about 1:8.

5. A distillate fuel containing from about 0.01 to about 0.5 percent by weight of the product obtained from the process of claim 4 wherein said monoolefin is octadecene-1, said allyl halide is allyl chloride, and said aluminum halide catalyst is dissolved in a C$_2$–C$_5$ alkyl monohalide.

6. An additive concentrate containing up to 50°/o by weight of the product-by-process described in claim 1 in a suitable solvent.

7. The additive concentrate of claim 6 wherein said suitable solvent is selected from toluene, zylene, isopropanol, kerosene and fuel oil.

8. The additive concentrate of claim 6 wherein said allyl halide:olefin molar ratio is from about 1:3 to about 1:8.

9. The additive concentrate of claim 8 wherein said allyl halide is selected from allyl chloride and allyl bromide.

10. The additive concentrate of claim 8 wherein said allyl halide is allyl chloride, said olefin is octadecene-1 and said aluminum halide is aluminum chloride.

* * * * *

PO-1050
(5/69)

UNITED STATES PATENT OFFICE
CERTIFICATE OF CORRECTION

Patent No. 3,658,492  Dated  April 25, 1972

Inventor(s)  Steve J. Messina

It is certified that error appears in the above-identified patent and that said Letters Patent are hereby corrected as shown below:

In Column 2, line 12, the ratio "1L8" should be -- 1:8 --.

In Column 5, Table 2, (Fuel No. 9) the term "Octadecend-1(4)" should be -- Octadecene-1(4) --.

Signed and sealed this 8th day of August 1972.

(SEAL)
Attest:

EDWARD M. FLETCHER, JR.         ROBERT GOTTSCHALK
Attesting Officer               Commissioner of Patents